US010789987B2

(12) United States Patent
Eronen et al.

(10) Patent No.: US 10,789,987 B2
(45) Date of Patent: Sep. 29, 2020

(54) ACCESSING A VIDEO SEGMENT

(71) Applicant: Nokia Technologies Oy, Espoo (FI)

(72) Inventors: Antti Eronen, Tampere (FI); Jussi Leppänen, Tampere (FI); Arto Lehtiniemi, Lempäälä (FI)

(73) Assignee: Nokia Technologies Oy, Espoo (FI)

( * ) Notice: Subject to any disclaimer, the term of this patent is extended or adjusted under 35 U.S.C. 154(b) by 0 days.

(21) Appl. No.: 15/761,904

(22) PCT Filed: Sep. 26, 2016

(86) PCT No.: PCT/FI2016/050670
§ 371 (c)(1),
(2) Date: Mar. 21, 2018

(87) PCT Pub. No.: WO2017/055684
PCT Pub. Date: Apr. 6, 2017

(65) Prior Publication Data
US 2018/0277161 A1    Sep. 27, 2018

(30) Foreign Application Priority Data

Sep. 29, 2015  (EP) ..................................... 15187333
Mar. 21, 2016  (EP) ..................................... 16161457

(51) Int. Cl.
*G06F 17/00*      (2019.01)
*G11B 27/10*      (2006.01)
(Continued)

(52) U.S. Cl.
CPC .......... *G11B 27/102* (2013.01); *G06F 3/0482* (2013.01); *G06F 16/70* (2019.01);
(Continued)

(58) Field of Classification Search
CPC ....... G11B 27/102; G11B 27/22; G11B 27/34; G06F 16/335; G06F 16/745;
(Continued)

(56) References Cited

U.S. PATENT DOCUMENTS 5,191,645 A * 3/1993 Carlucci ............... G11B 27/024
345/581
6,353,461 B1 * 3/2002 Shore ................... G11B 27/034
348/239
(Continued)

FOREIGN PATENT DOCUMENTS

CN    101272464 A    9/2008
CN    102480565 A    5/2012
(Continued)

OTHER PUBLICATIONS

Varadarajan et al., Topic Models for Scene Analysis and Abnormality Detection, IEEE 2009, pp. 1338-1345. (Year: 2009).*
(Continued)

*Primary Examiner* — Cong-Lac Huynh
(74) *Attorney, Agent, or Firm* — Harrington & Smith

(57) ABSTRACT

A method comprising: causing provision of a visual access menu to enable a user to access video segments of a scene comprising: causing display of at least a portion an image of the scene; causing display, at a first location in the scene, of a first user-selectable menu option that when selected causes access to one or more first video segments of activity at the first location in the scene; and causing display, at a second location in the scene, of a second user-selectable menu option that when selected causes access to one or more second video segments of activity at the second location in the scene.

21 Claims, 6 Drawing Sheets

(51) Int. Cl.
*G06F 16/74* (2019.01)
*G06F 16/732* (2019.01)
*H04N 5/91* (2006.01)
*H04N 21/845* (2011.01)
*H04N 21/4402* (2011.01)
*H04N 21/472* (2011.01)
*H04N 21/44* (2011.01)
*H04N 21/431* (2011.01)
*G06F 16/70* (2019.01)
*G11B 27/34* (2006.01)
*G06F 3/0482* (2013.01)
*G11B 27/22* (2006.01)
*H04N 5/232* (2006.01)
*G06K 9/00* (2006.01)

(52) U.S. Cl.
CPC ........ *G06F 16/7335* (2019.01); *G06F 16/745* (2019.01); *G11B 27/22* (2013.01); *G11B 27/34* (2013.01); *H04N 5/23238* (2013.01); *H04N 5/91* (2013.01); *H04N 21/4312* (2013.01); *H04N 21/44008* (2013.01); *H04N 21/440263* (2013.01); *H04N 21/47217* (2013.01); *H04N 21/8456* (2013.01); *G06F 2203/04804* (2013.01); *G06K 9/00765* (2013.01); *G06K 2009/00738* (2013.01)

(58) Field of Classification Search
CPC .... G06F 3/0482; G06F 16/7335; G06F 16/70; H04N 21/440263; H04N 21/47217; H04N 21/8456
USPC .................................................. 715/201, 720
See application file for complete search history.

(56) References Cited

U.S. PATENT DOCUMENTS

| | | | | |
|---|---|---|---|---|
| 6,504,990 | B1* | 1/2003 | Abecassis | G11B 19/02 348/E5.105 |
| 6,829,428 | B1* | 12/2004 | Quintos | G11B 27/034 386/230 |
| 6,928,233 | B1* | 8/2005 | Walker | H04N 19/503 386/241 |
| 7,356,830 | B1* | 4/2008 | Dimitrova | G06F 16/748 725/51 |
| 8,161,369 | B2* | 4/2012 | Bhatt | G06F 16/4393 715/202 |
| 8,593,485 | B1* | 11/2013 | Anguelov | G09G 5/377 345/619 |
| 9,159,364 | B1* | 10/2015 | Matias | G11B 27/034 |
| 9,501,915 | B1* | 11/2016 | Laska | H04N 7/181 |
| 2002/0051010 | A1* | 5/2002 | Jun | G11B 27/005 715/723 |
| 2003/0163832 | A1* | 8/2003 | Tsuria | H04N 5/76 725/135 |
| 2005/0031296 | A1* | 2/2005 | Grosvenor | G06F 16/784 386/282 |
| 2005/0240980 | A1* | 10/2005 | Jun | G11B 27/105 725/135 |
| 2007/0003223 | A1* | 1/2007 | Armstrong | G11B 27/34 386/217 |
| 2008/0046925 | A1 | 2/2008 | Lee et al. | |
| 2008/0109860 | A1* | 5/2008 | Glashow | H04N 21/4312 725/87 |
| 2008/0155627 | A1* | 6/2008 | O'Connor | H04N 21/4788 725/109 |
| 2008/0163059 | A1* | 7/2008 | Craner | H04N 21/4532 715/719 |
| 2008/0232687 | A1* | 9/2008 | Petersohn | G06K 9/00711 382/173 |
| 2008/0316311 | A1 | 12/2008 | Albers et al. | |
| 2011/0096149 | A1* | 4/2011 | Au | G06K 9/00771 348/47 |
| 2011/0129201 | A1* | 6/2011 | McLean | H04N 21/8456 386/296 |
| 2011/0231765 | A1 | 9/2011 | Sim et al. | |
| 2013/0036442 | A1* | 2/2013 | Wingert | H04N 21/42209 725/60 |
| 2013/0038794 | A1 | 2/2013 | Ackley et al. | |
| 2013/0094831 | A1* | 4/2013 | Suzuki | G11B 27/34 386/230 |
| 2015/0243327 | A1* | 8/2015 | Zhang | H04N 21/8133 725/88 |
| 2015/0325268 | A1* | 11/2015 | Berger | G11B 27/102 386/248 |
| 2016/0275641 | A1* | 9/2016 | Bostick | H04N 5/265 |
| 2018/0270497 | A1* | 9/2018 | Mukherjee | H04N 19/17 |

FOREIGN PATENT DOCUMENTS

| | | |
|---|---|---|
| CN | 103823870 A | 5/2014 |
| EP | 2267716 A1 | 12/2010 |
| EP | 2455871 A2 | 5/2012 |

OTHER PUBLICATIONS

Weiss et al., Composition and Search with a Video Algebra, IEEE 1995, pp. 1-14. (Year: 1995).*
Hu et al., Action Detection in Complex Scenes with Spatial and Temporal Ambiguities, IEEE 2009, pp. 128-135. (Year: 2009).*
Ngo et al., Automatic Video Summarization by Graph Modeling, IEEE 2003, pp. 1-6. (Year: 2003).*
Durrant et al., Seam Hiding for Looping Video, ACM 2017, pp. 1-10. (Year: 2017).*
"A Video Effect That Shows the Same Person Three Times", YouTube, Retrieved on Mar. 13, 2018, Webpage available at : https://www.youtube.com/watch?v=q8dtMj23ZxM.
Partial European Search Report received for corresponding European Patent Application No. 16161457.3, dated Nov. 18, 2016, 8 pages.
International Search Report and Written Opinion received for corresponding Patent Cooperation Treaty Application No. PCT/FI2016/050670, dated Jan. 2, 2017, 19 pages.
Extended European Search Report received for corresponding European Patent Application No. 16161457.3, dated Mar. 24, 2017, 15 pages.
Soren Pirk et al. "Video Enhanced Gigapixel Panoramas" SA 2012—Siggraph Asia 2012 Technical Briefs, ACM, New York, NY, USA Nov. 28, 2012, pp. 1-4, XP058010288. DOI:10.1145/2407746. 2407753. ISBN: 978-14503-1915-7 and the related video in URL: https://vimeo.com/50745397.
Anonymous: "Photosynth—Wikipedia, the free encyclopaedia" Feb. 26, 2013, pp. 1-4, XP055131993. Retrieved from the internet: URL: http://en.wikipedia.org/w/index.php? Title=Photosynth&oldid= 540666238 [ retrieved on Jun. 28, 2014].

* cited by examiner

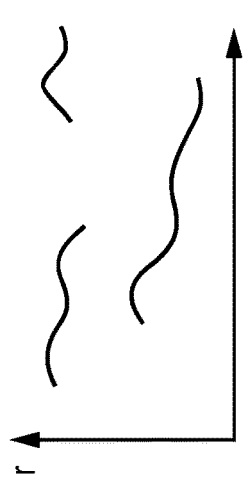
FIG. 6
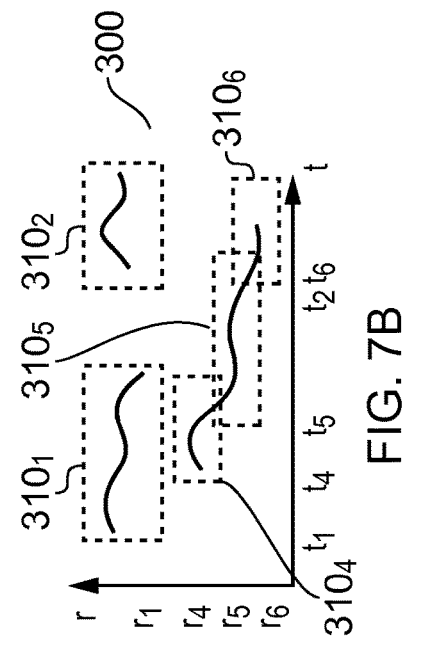
FIG. 7A
FIG. 7B
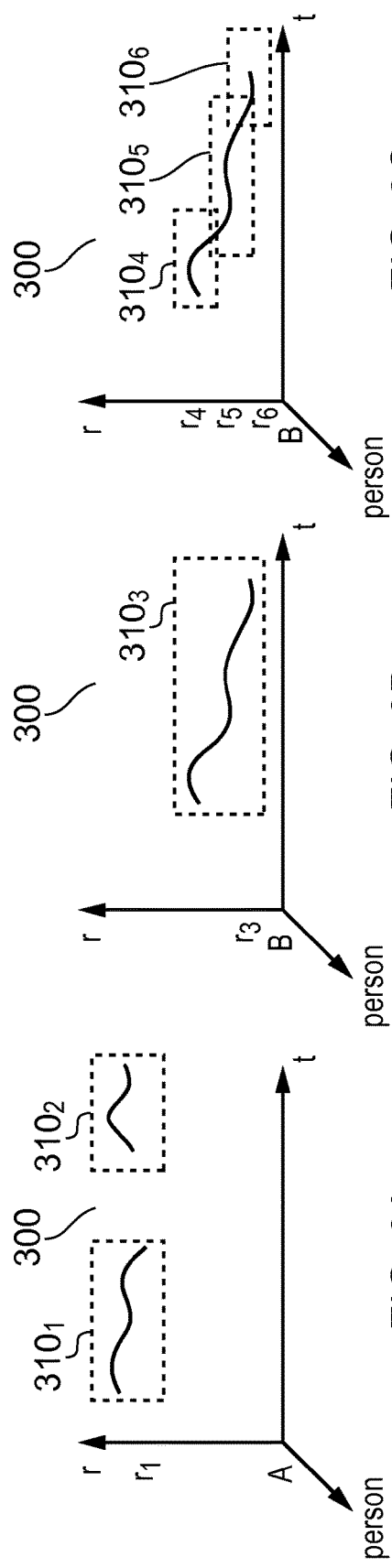
FIG. 8A
FIG. 8B
FIG. 8C

ACCESSING A VIDEO SEGMENT

RELATED APPLICATION

This application was originally filed as Patent Cooperation Treaty Application No. PCT/FI2016/050670 filed Sep. 26, 2016 which claims priority benefit to EP Patent Application No. 15187333.8, filed Sep. 29, 2015 and EP Patent Application 16161457.3, filed Mar. 21, 2016.

TECHNOLOGICAL FIELD

Embodiments of the present invention relate to accessing a video segment.

BACKGROUND

When video is recorded it is desirable for a user to be able to access a desired segment of the video.

This may, for example, be achieved by fast forwarding or fast rewinding the video, skipping forward or backwards by chapters, or by selecting chapters from a menu.

BRIEF SUMMARY

According to various, but not necessarily all, embodiments of the invention there is provided a method comprising: causing provision of a visual access menu to enable a user to access video segments of a scene comprising: causing display of at least a portion an image of the scene; causing display, at a first location in the scene, of a first user-selectable menu option that when selected causes access to one or more first video segments of activity at the first location in the scene; and causing display, at a second location in the scene, of a second user-selectable menu option that when selected causes access to one or more second video segments of activity at the second location in the scene.

According to various, but not necessarily all, embodiments of the invention there is provided a method comprising: using image processing to parameterize one or more videos; determining spatio-temporal video segments based on parameterization; determining a first video excerpt representing a first video segment and create a first link from a video excerpt to the first video segment; and displaying an access menu of video excerpts for selection by a user, wherein user selection of the first video excerpt in the access menu activates the first link to access the first video segment.

According to various, but not necessarily all, embodiments of the invention there is provided examples as claimed in the appended claims.

BRIEF DESCRIPTION

For a better understanding of various examples that are useful for understanding the brief description, reference will now be made by way of example only to the accompanying drawings in which:

FIG. 6 illustrates an example video that has been parameterized using position and time;

FIGS. 7A and 7B illustrate different examples of segmenting the video illustrated in FIG. 6;

FIG. 8A, 8B, 8C illustrate different examples of parameterization and segmentation of the video illustrated in FIG. 6;

FIGS. 12A and 12B illustrate an object-specific parameterization of the video according to when and where any activity occurs in the video and additionally, at least, who or what the activity is performed in relation to;

DETAILED DESCRIPTION

Figure 1:
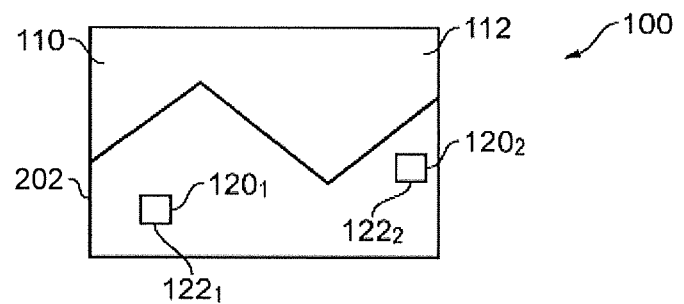
FIG. 1 illustrates an example of a method of providing a visual access menu that enables a user to access video segments of a scene.

The figures illustrate a method 100 for providing a visual access menu 110 that enables a user to access video segments 310 of a scene 202. The method comprises:

a) causing display of an image 112 of at least a portion of the scene 202 b) causing display, at a first location $122_1$ in the scene 202, of a first user-selectable menu option $120_1$ that when selected causes access to one or more first video segments 310 of activity at the first location $122_1$ in the scene 202; and c) causing display, at a second location $122_2$ in the scene 202, of a second user-selectable menu option $120_2$ that when selected causes access to one or more second video segments 310 of activity at the second location $122_2$ in the scene 202.

FIG. 1 illustrates an example of the method 100. The result of the method 100 is a visual access menu 110 that enables a user to access video segments 310 of a scene 202.

The menu 110 comprises an image 112 of the scene 202 and one or more user-selectable menu options $120_n$ at different locations $122_n$ in the scene 202, that when selected cause access to one or more respective video segments 310 of activity at the location $122_n$ in the scene 202.

The user selectable menu options $120_n$ are in this example and in other examples may be user-selectable menu items. A field of view of the scene 202 is typically greater than the field of view of the display used to display the scene and consequentially only a portion of the scene 202 is displayed at any one time without zooming out (reducing resolution).

In the illustrated example, but not necessarily all examples, the field of view of the display relative to the field of view of the scene is such that multiple user-selectable menu options $120_n$ are displayed simultaneously at different locations $122_n$ in the scene 202. However, if the field of view of the display changes relative to the field of view of the scene or the separation of the locations $122_n$ of the multiple user-selectable menu options $120_n$ were greater, then only one or none of the multiple user-selectable menu options $120_n$ would be displayed. A user may be able to change a size of the field of view of the display relative to the field of view of the scene by zooming in or zooming out. A user may be able to change a relative position of the field of view of the display relative to the field of view of the scene 202 by panning left or right and/or by panning up and down.

In this example, but not necessarily all examples, the displayed menu 110 comprises: the image 112 of at least a portion of the scene 202; at a first location $122_1$ in the scene 202, a first user-selectable menu option $120_1$ that when selected causes access to one or more first video segments 310; and at a second location $122_2$ in the scene 202, a second user-selectable menu option $120_2$ that when selected causes access to one or more second video segments 310.

The one or more first video segments 310 of activity at the first location $122_1$ in the scene 202 are segments of video that record activity at, near or in relation to the first location $122_1$ in the scene 202. For example the one or more first video segments 310 may be segments of video that record activity at the first location $122_1$ in the scene 202 and/or record activity near to the first location $122_1$ in the scene 202 and/or record activity that starts, ends or temporarily occurs at or near the first location $122_1$. The one or more first video segments 310 may be captured by the same or by different video cameras.

The one or more second video segments 310 of activity at the second location $122_2$ in the scene 202 are segments of video that record activity at, near or in relation to the second location $122_2$ in the scene 202. For example the one or more second video segments 310 may be segments of video that record activity at the second location $122_2$ in the scene 202 and/or record activity near to the second location $122_2$ in the scene 202 and/or record activity that starts, ends or temporarily occurs at or near the second location $122_2$. The one or more second video segments 310 may be captured by the same or by different video cameras.

The one or more first video segments 310 and the one or more second video segments 310 may be captured by the same or by different video cameras.

Figure 2:
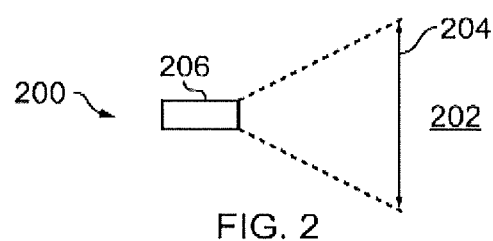
FIG. 2 illustrates an example of a system for capturing video of a scene.

FIG. 2 illustrates an example of a system 200 for capturing video of a scene 202. The system 200 comprises one or more digital video cameras 206 that capture video of the whole or a part of the scene 202 determined by the field of view 204 of the camera 206.

Figure 3:
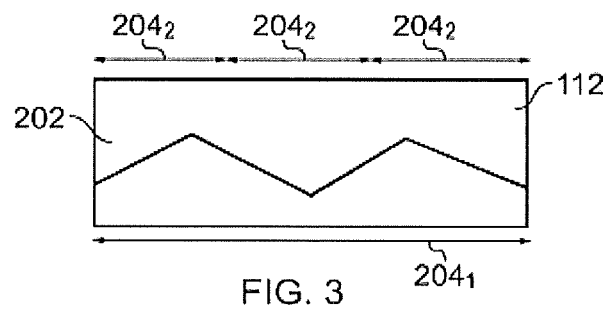
FIG. 3 illustrates an example of an image of the scene.

FIG. 3 illustrates an example of an image 112 of the scene 202 created from a single field of view $204_1$ of a single camera or created by combining overlapping fields of view $204_2$ of different cameras. In some but not necessarily all examples, a panoramic camera 206 may be used to create a panoramic image 112 that has a very wide field of view. It may have a very large width W to height H aspect ratio, for example, exceeding 4 or 5.

The image 112 is defined by values of the image pixels. Each image pixel has a position r within the image 112. A video of the scene 202 is defined by a temporal sequence of images 112. The first location $122_1$ in the scene 202 may be defined by a first position $r_1$ 302. The second location $122_2$ in the scene 202 may be defined by a second position $r_2$ 302.

Figure 4:
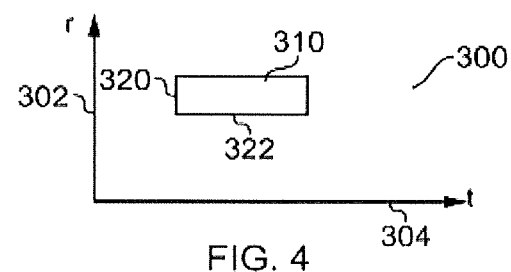
FIG. 4 illustrates an example of segmenting a video.

FIG. 4 illustrates an example of segmenting a video 300. The video 300 in this example is represented as a spatio-temporal area—all values of position r 302 are plotted against time. The video 300 may originate from one or more cameras and may comprise multiple video files. A video segment 310 is a spatio-temporal sub-area. The video segment 310 is spatially limited and temporally limited. The video segment, in this example, is limited to a sub-set 320 of the possible values for position r 302 and to an independent sub-set 322 of the possible values for time t 304. The determination of a video segment 310 comprises determining the sub-set 320 of the values for position r 302 and the sub-set 322 of the values for time t 304.

FIG. 4 illustrates an example of parameterization of the video 300 according to multiple parameters. In this example the parameters are the position r 302 and time t 304. A video segment 310 is determined based on the parameterization of video 300, and, in particular the sub-sets 320, 322 for the respective possible parameter values.

It will be noticed that in this example, the sub-set 320 of the values for position r 302 defines a continuous uninterrupted range of the values for position r 302 (contiguous pixels) and the sub-set 322 of the possible values for time t 304 defines a continuous uninterrupted range of the values for time t 304.

If the position r 302 is defined in terms of orthogonal Cartesian component x, y then a segment may be defined spatially by a range of x, a range of y or a range of both x and y.

Other parameterization of the video 300 is possible.

Figure 5:
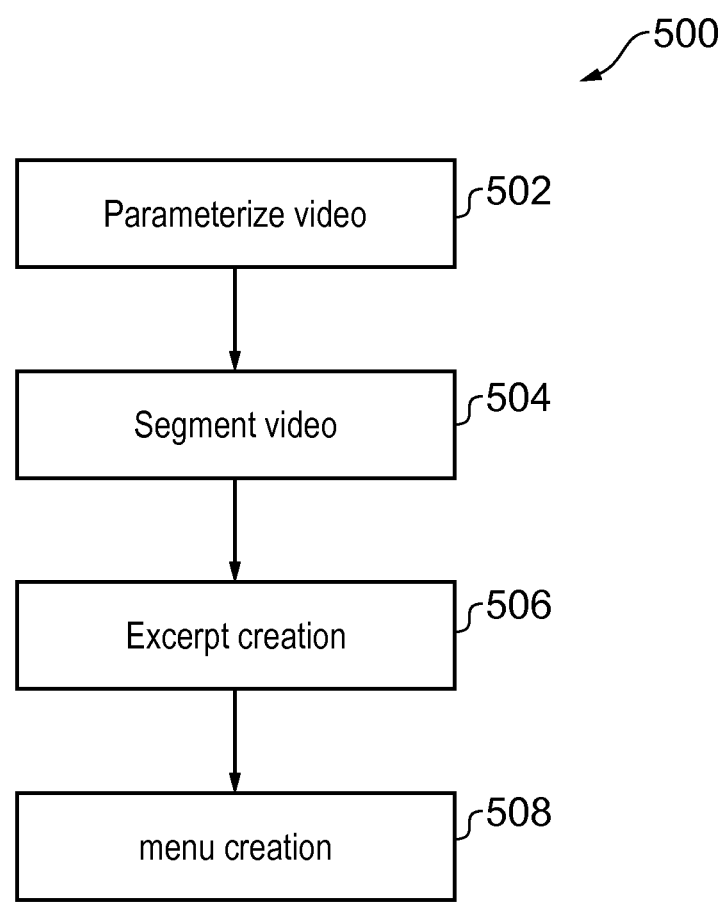
FIG. 5 illustrates an example of a method for generating the visual access menu.

FIG. 5 illustrates an example of a method 500 for generating the visual access menu 110.

At block 502, one or more videos 300 defining the scene 202 are parameterized. The videos 300 may be spatially overlapping or spatially distinct. The videos 300 may be temporally overlapping or temporally distinct. As a combination they record activity in the scene 202 over time.

The videos 300 may be calibrated to have a common spatial reference frame so that the spatial relationship of one video to another is known. Alternatively, image processing may be used to create a common spatial reference frame. Image processing may be used to recognise fixed image features in the videos and recognise which videos overlap spatially by matching patterns of the fixed image features between videos. In this way the one or more videos 300 defining the scene 202 can be parameterized using a position r 302 in a common (shared) spatial reference frame.

The videos may be calibrated to have a common time reference frame so that the temporal relationship of one video to another is known. Alternatively, image processing may be used to create a common time reference frame. Image processing may be used to recognise changing image features in the videos and recognise which videos overlap temporally (and spatially) by matching patterns of the changing image features between videos. In this way the one or more videos 300 defining the scene 202 are parameterized using a time t 304 in a common (shared) time reference frame.

Image processing may be used to create other reference frames for parameterization of the videos 300. Image processing may be used to recognise an event in the videos 300 by matching patterns of changing image features with a reference for the event. In this way the one or more videos 300 defining the scene 202 are parameterized using the event as a parameter.

The occurrence of the event may be logged as occurring at position r and at time t in the videos 300, causing parameterization of the video 300 according to at least when and where an event occurs in the video 300.

One example of an event may for example be activity in the scene 202, which means a change in a content of the scene.

Another example of an event may for example be recognition of a particular user or object.

Another example of an event may for example be recognition of an interaction between two or more persons or objects.

Another example of an event may for example be recognition of a particular action or activity.

An event may be a combination of events such as (any) activity in the scene 202 by a particular person or in relation to a particular object, causing parameterization of the video according to at least when and where activity occurs in the video and who or what is performing the activity.

Another example of an event that is a combination of events, is where the event is a particular activity in the scene 202 by any person or by a particular person or in relation to any object or a particular object, causing parameterization of the video according to at least when and where activity occurs in video and what the activity is.

The parameters used for parameterization of the video 300 may a fixed set of parameters or a variable set of parameters. For example, a user may be able to determine one or more or all of the parameters used for parameterization of the video 300.

Additionally or alternatively, the video 300 may be automatically parameterized using putative parameters to determine an optimal set of parameters for parameterization of the video 300. The optional set of parameters may then be automatically used for parameterization of the video 300 or they may be presented as selectable parameters to a user from which a user may be able to determine one or more or all of the parameters used for parameterization of the video or videos 300.

One method for optimal parameterization of the video 300 is to use k-means clustering. Given a set of events $(x_1, x_2, \ldots, x_n)$. An event may be defined in a parameter space by a vector having a component value for each parameter. Each event is a vector in the parameter space defined by the multiple parameters, k-means clustering places the n events into k ($\leq$n) sets $S=\{S_1, S_2, \ldots, S_k\}$ so as to minimize the within-cluster sum of squares. It solves:

$$\arg\min_S \sum_{i=1}^{k} \sum_{x \in S_i} \|x - \mu_i\|^2$$

where $\mu_i$ is the mean of members of $S_i$. This finds the optimal clustering for a defined parameter space. A search may be performed over multiple parameter spaces to find the optimal parameter space and the optimal clustering for that parameter space.

Parameters may be used to define events in terms of where the event occurs, when the event occurs, and other characteristics of the event or a participant in the event such as, for example, who or what is involved in the event, what activity the event relates to, parameters describing a participant such as speed, distance from ground, relative positions of joints, relative position to other objects etc.

At block 504, the method 500 determines one or more video segments 310 based on the parameterization of the video 300.

For example, events that occur sequentially in time and are clustered according to position and, optionally, one or more other parameters, may be used to define a video segment 310. These events are inliers within the cluster and may indicate a usual prototypical event for the time period of the video.

FIG. 4 illustrates an example of parameterization of the video 300 according to multiple parameters—the position r 302 and time t 304. A video segment 310 is determined based on the parameterization of video 330, and, in particular the sub-sets 320, 322 for the respective possible parameter values. The sub-set 320 of position r 302 defines a continuous uninterrupted range and the sub-set 322 of time t 304 defines a continuous uninterrupted range.

In addition or alternatively, events that are not clustered may be used to define a video segment. These events are outliers from the clusters and may indicate an unusual atypical event for the time period of the video.

A discontinuous transition in a parameter value may be used to determine a start or end of a video segment 310.

A video segment 310 may be referenced by a vector in the parameter space.

At block 506, the method determines which video excerpts, if any, should represent which video segments 310 in an access menu 110. The video excerpts are used as user-selectable menu options 120 in the access menu 110 that, when selected, access the represented video segment 310.

At block 508, the method comprises displaying an access menu 110 of video excerpts for selection by a user. User selection of a video excerpt in the access menu 110 activates a link to access a particular video segment or video segments 310.

Where a video segment 310 is represented by a video excerpt in the access menu 110, then there is typically a one-to-one mapping from the video excerpt to the video segment 310. For example, the video segment may comprise or be associated with a link to the video segment 310 that is activated when a user selects the video excerpts from the menu 110 causing the video segment to play.

The location of the video excerpt in the access menu 110, is the same as the location of the linked video segment 310. For example, the parameter position r 302 that parameterizes the video segment 310 may be used to locate the video excerpt in the scene 202 displayed in the access menu 110.

Referring back to FIG. 1, the first selectable menu option $120_1$ is located at the first location $122_1$, in the scene 202, and when selected causes access to first video segment(s) 310 that concern activity at the first location $122_1$, in the scene 202. The first selectable menu option $120_1$ is a playing first video excerpt that links to the first video segment(s) 310. The second selectable menu option $120_2$ is located at the second location $122_2$, in the scene 202, and when selected causes access to second video segment(s) 310 that concern activity at the second location $122_2$, in the scene 202. The second selectable menu option $120_2$ is a playing second video excerpt that links to the second video segment(s) 310.

The video excerpts operating as user selectable menu options 120, including the first video excerpt $120_1$ and the second video excerpt $120_2$, may be simultaneously displayed, while playing at a reduced resolution compared to the linked video segment(s) 310.

The video excerpt s operating as user selectable menu option 120 including the first video excerpt $120_1$ and the second video excerpt $120_2$ may be displayed in a semi-transparent form overlaying the image 112 of the scene 202, forming 'ghost' images.

Each video excerpt may be a short video clip, taken from the video segment 310 it links to, playing in a loop. The user-selection of such a video excerpt may cause playing of the linked video segment 310.

If the video excerpt links to multiple video segments, it may be a concatenation of short video clips, one from each of the linked video segments, playing in a loop. The order of play of the video clips in the loop may be in the same temporal order as the video segments they link to. User-selection of such a video excerpt causes access to the linked video segments, for example, in the form of a menu. Thus multiple video segments for a single location may be represented in the access menu by a single user selectable menu option 120 at a 'root level', selection of that user selectable menu option 120 may cause display of multiple user selectable menu options 120, one for each video segment 310, at a next level. These multiple user-selectable menu options 120 when selected may cause access to video segments 310 of activity at the same location 122 in the scene 202 at different times.

FIG. 6 illustrates an example video that has been parameterized using position r 302 and the time t 304 into events occurring at (t, r). FIGS. 7A, 7B, 8A, 8B, 8C illustrate this example video 300 after it has been parameterized using position r 302 and the time t 304 into events occurring at (t, r) and segmentation of the events into distinct video segments $310_n$ that occur at $(t_n, r_n)$.

FIG. 7A illustrates an example video 300 that has been parameterized using position r 302 and the time t 304 into events occurring at (t, r). It additionally illustrates the segmentation of the events into a first set of distinct video segments 310 comprising video segments $310_1$ $310_2$ at a position $r_1$ and video segment $310_3$ at a position $r_3$, The visual access menu 110 for these video segments 310 may comprise a first user-selectable menu option $120_1$, at a first location $122_1$ in the scene 202 corresponding to the position $r_1$, that when selected causes access to the video segments $310_1$ $310_2$ of activity at the first position $r_1$ and comprise a second user-selectable menu option $120_2$, at a second location $122_1$ in the scene 202 corresponding to the position $r_3$, that when selected causes access to the video segments $310_3$ of activity at the position $r_3$.

FIG. 7B illustrates the video 300, of FIG. 7A, but illustrates the segmentation of the events into a different second set of distinct video segments 310. In this example, the video segment $310_3$ at a position $r_3$ illustrated in FIG. 7A has been sub-divided into three different video segments $310_4$, $310_5$, $310_6$, at respective positions $r_4$, $r_5$, $r_6$. The visual access menu 110 for these video segments 310 may comprise a first user-selectable menu option $120_1$, at a first location $122_1$ in the scene 202 corresponding to the position $r_1$, that when selected causes access to the video segments $310_1$ $310_2$ of activity at the first position $r_1$ and comprise, for each of n=4, 5, 6, a further user-selectable menu option $120_n$ at location $122_n$ in the scene 202 corresponding to the position $r_n$, that when selected causes access to the video segment $310_n$ of activity at the position $r_n$.

In the example of FIG. 7A a video 300 recording a person or object following route has been segmented into a single video segment $310_3$, whereas in FIG. 7B the video 300 recording the person or object following the route has been segmented into a three video segments $310_4$, $310_5$, $310_6$.

FIG. 8A illustrates the video 300 of FIG. 7A, but the video 300 has been parameterized using not only position r 302 and the time t 304 but also person A into events occurring at (t, r) by person A. It illustrates the segmentation of the events into a sub-set of the set of distinct video segments 310 illustrated in FIG. 7A comprising video segments $310_1$ $310_2$ at a position $r_1$ but not video segment $310_3$ at position $r_3$ The visual access menu 110 for these video segments $310_1$ $310_2$ may comprise a first user-selectable menu option $120_1$, at a first location $122_1$ in the scene 202 corresponding to the position $r_1$, that when selected causes access to the video segments $310_1$ $310_2$ of activity at the first position $r_1$ by person A.

FIG. 8B illustrates the video 300, of FIG. 7A, but the video 300 has been parameterized using position r 302, the time t 304 and a person B into events occurring at (t, r) by person B. It illustrates the segmentation of the events into a sub-set of the first set of distinct video segments 310 illustrated in FIG. 7A comprising video segment $310_3$ at a position $r_3$ but not video segments $310_1$ $310_2$ at a position $r_1$. The visual access menu 110 for this video segment $310_3$ may comprise a user-selectable menu option $120_2$, at a location 122 in the scene 202 corresponding to the position $r_3$, that when selected causes access to the video segment $310_3$ of activity at the position $r_3$ by person B.

FIG. 8C illustrates the video 300, of FIG. 7B, but the video 300 has been parameterized using position r 302 and the time t 304 but also person B into events occurring at (t, r) by person B. It illustrates the segmentation of the events into a sub-set of the second set of distinct video segments 310 illustrated in FIG. 7B comprising video segments $310_4$, $310_5$, $310_6$, at respective positions $r_4$, $r_5$, $r_6$. The visual access menu 110 for these video segments 310 may comprise user-selectable menu options $120_n$, at locations $122_n$ in the scene 202 corresponding to the position $r_n$, that when selected causes access to the video segments $310_n$ of activity at the position $r_n$, where n=4, 5, 6.

The FIGS. 6, 7A-7B and 8A-8C illustrate parameterization of the video 300 according to at least when and where activity occurs in the video 300 and the determination of video segments 310 based on at least when and where activity occurs in the video 300.

FIGS. 8A, 8B, 8C illustrate parameterization of the video 300 according to at least when and where activity occurs in video 300 and an additional parameter (who is performing the activity) and the determination of video segments 310 based on at least when and where activity occurs in the video and the additional parameter (who is performing the activity)

While in FIGS. 8A, 8B, 8C the additional parameter is who is performing the activity, in other examples the additional parameter may be a different parameter or a combination of parameters. For example, the additional parameter may be or include what the activity is.

The user may be able to control over which period of time the video 300 is parameterized and therefore over which period of time the video segments 310 are from. A user input control such as, for example, a slider may be used to change this time period.

The consequence of changing the time period may be appreciated from FIG. 7B. Each video segments $310_n$ has a position $r_n$ 302 and a start time $t_n$ 304.

FIG. 7B illustrates the video 300, of FIG. 7A, but illustrates the segmentation of the events into a different second set of distinct video segments $310_4$, $310_5$, $310_6$. In this example, one of the video segments $310_3$ illustrated in FIG. 7A has been sub-divided into three different video segments $310_4$, $310_5$, $310_6$. The video 300 comprises video segments $310_1$ $310_2$ at a position $r_1$ at times $t_1$, $t_1$ and video segments $310_4$, $310_5$, $310_6$, at respective positions $r_4$, $r_5$, $r_6$ and times at time $t_4$, $t_5$, $t_6$. When the time period is long enough to cover at least times $t_1$, $t_2$, $t_4$, $t_5$, $t_6$, the visual access menu 110 for these video segments 310 may comprise a first user-selectable menu option $120_1$, at a first location $122_1$ in the scene 202 corresponding to the position n, that when selected causes access to the video segments $310_1$ $310_2$ of activity at the first position $r_1$ and comprise, for each of n=4, 5, 6, a further user-selectable menu option $120_n$, at location $122_n$ in the scene 202 corresponding to the position $r_n$, that when selected causes access to the video segment $310_n$ of activity at the position $r_n$ at time $t_n$. However, when the time period is shortened to cover only times $t_1$ and $t_4$ but not times $t_2$, $t_5$, $t_6$, the visual access menu 110 for these video segments 310 may comprise a first user-selectable menu option $120_1$, at a first location $122_1$ in the scene 202 corresponding to the position n, that when selected causes access to the video segments $310_1$ of activity at the first position $r_1$ at time $t_1$, and comprise a further user-selectable menu options $120_4$, at a location $122_4$ in the scene 202 corresponding to the position $r_4$, that when selected causes access to the video segments $310_4$ of activity at the position $r_4$ at time $t_4$.

As described above in relation to FIG. 5, image processing may be used to parameterize the videos 300. Image processing may be used to recognise an event in the videos 300 and features of the event may be used as parameters.

The event features may for example be activity in the scene 202, recognition of a particular user or object, recognition of an interaction between two or more persons or objects, recognition of a particular action or activity such as following a route to or from a location, etc.

The occurrence of the event may be logged as occurring at position r and at time t in the video 300, causing parameterization of the video 300 according to at least when and where an event occurs in the video 300.

An event may be a combination of one of more different alternatives such as: a particular activity in the scene 202/any activity in the scene 202; by a particular person/by any person; in relation to a particular object/not in relation to a particular object.

Parameterization of the video 300 may be according to when and where any activity occurs in the video 300 and additionally according to one or more additional parameters which may include:

what the activity is; who or what is performing the activity; who or what the activity is performed in relation to.

Events that occur sequentially in time and are clustered according to position and, optionally, one or more of the additional parameters, may be used to define a video segment 310. These events are inliers within the cluster and may indicate a usual prototypical event for the time period of the video.

A subject-specific event may be a combination of events such as (any) activity in the scene 202 by a particular person causing subject-specific parameterization of the video 300 according to when and where any activity occurs in the video 300 and additionally, at least, who or what is performing the activity.

An object-specific event may be a combination of events such as (any) activity in the scene 202 in relation to a particular object causing object-specific parameterization of the video 300 according to when and where any activity occurs in the video and additionally, at least who or what the activity is performed in relation to.

An activity-specific event may be a combination of events such as a particular activity in the scene 202 by any person or in relation to any object, causing activity-specific parameterization of the video 300 according to when and where activity occurs in video and additionally, at least, what the activity is.

The parameters used for parameterization of the video 300 may a fixed set of parameters or a variable set of parameters. For example, a user may be able to determine one or more or all of the parameters used for parameterization of the video or videos 300.

User-selection of a user-selectable menu options $120_n$ may cause a change in the additional parameter(s) or a constraint of existing parameters, resulting in new parameterization of the video, new clustering and a new visual access menu 110 comprising new user-selectable menu options $120_n$. The different locations of user-selectable menu options $120_n$ in the visual access menu 110 may enable by user selection different constraints of an additional parameter such as the subject, the location, the activity or the time.

By performing user-selection of user-selectable menu options $120_n$ in a sequential series of visual access menus 110 the user may sequentially constrain the parameters, resulting in increasingly specific parameterization of the video 300, increasingly specific clustering and an increasingly specific visual access menu 110 comprising user-selectable menu options $120_n$. The sequential constraints may be used to enable by sequential user selection from sequential visual access menus 110 different constraints of multiple additional parameters such as a combination of the subject, the location, the activity and the time.

FIGS. 11A, 11B, 11C, 11D illustrate a 'subject-specific' parameterization of the video 300 according to when and where any activity occurs in the video and additionally, at least, who or what is performing the activity.

Figure 11A:
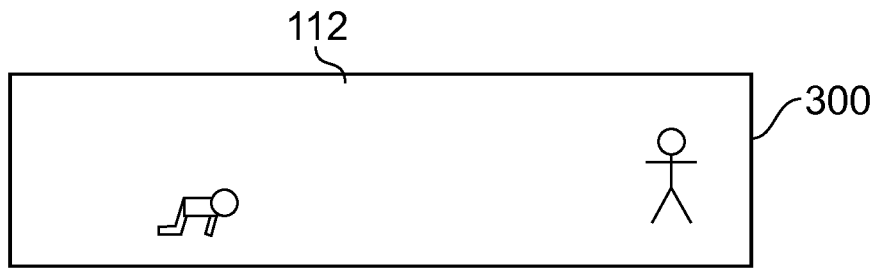
FIGS. 11A, 11B, 11C, 11D illustrate a subject-specific parameterization of the video according to when and where any activity occurs in the video and additionally, at least, who or what is performing the activity.

FIG. 11A illustrates a displayed panoramic scene 112 of the video 300. This displayed scene includes two possible subjects a first subject (a baby) to the left and a second subject (a man) to the right. It may be a visual access menu 110 user-selectable menu options $120_n$ for different subjects.

Figure 11B:
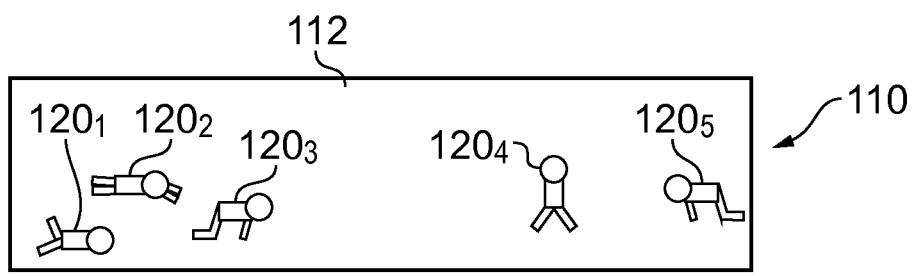

When one of the subjects is selected by, for example, a user touching the display portion corresponding to the subject, then the method 100 is performed and provides a visual access menu 110 as illustrated in FIG. 11B that enables a user to access video segments 310 of the scene 202. Different user-selectable menu options $120_n$ are displayed at different locations in the scene 112. The different locations represent different locations (and times). Selection of a particular user-selectable menu option causes access to one or more first video segments 310 of activity at that location $122_1$ in the scene 202.

Figure 11C:
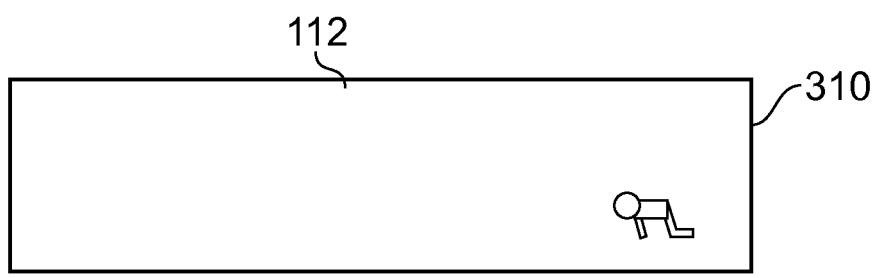
Figure 11D:
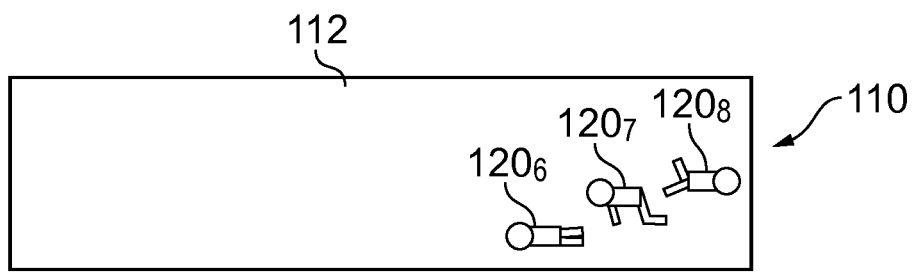

In the example illustrated, in FIG. 11B, the user-selectable menu option $120_4$ is selected.

Where one video segment is associated with this subject at this location, that video segment 310 is played to the user as illustrated in FIG. 11C.

Where multiple different temporally distinct video segments 310 are associated with this subject at this location, the video 300 is re-parameterised as described in relation to, for example, FIG. 7B to convert the menu option $120_5$ in FIG. 11B that represents multiple video segments at that location at different times into multiple user-selectable menu option $120_m$ in FIG. 11D that each represent a video segment 310 at that location at a different time. The method 100 may, for example, be re-performed but constrained only to events for the selected subject at the selected location, to provide a visual access menu 110 as illustrated in FIG. 11D that enables a user to access video segments 310 of the scene 202. Different user-selectable menu options $120_n$ are displayed at different locations in the scene 112. The different locations represent different times. Selection of a particular user-selectable menu option causes access to one or more video segments 310 of activity by the selected subject, at that location in the scene 202, at different times.

Therefore user selection at FIG. 11A selects the subject, user-selection at FIG. 11B selects the location and user selection at FIG. 11D selects the time.

In for example, FIGS. 11B and 11D, there is simultaneous display, at a first location $122_n$ in the scene 202, of a first user-selectable menu option $120_n$ that when selected causes access to one or more first video segments 310 of activity by the selected subject at the first location $122_n$ in the scene 202 and, at a second location $122_m$ in the scene 202, of a second user-selectable menu option $120_m$ that when selected causes access to one or more second video segments 310 of activity by the selected subject at the second location $122_m$ in the scene 202.

Figure 12A:
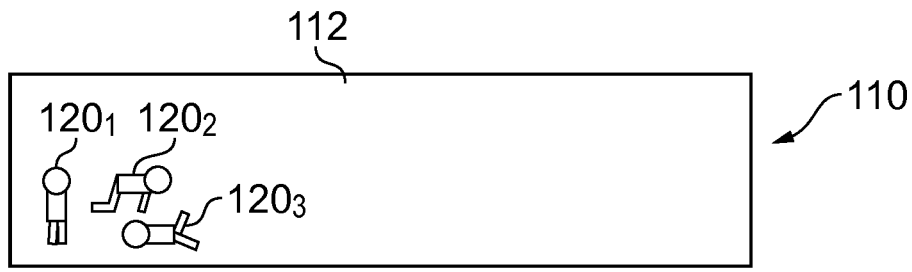
Figure 12B:
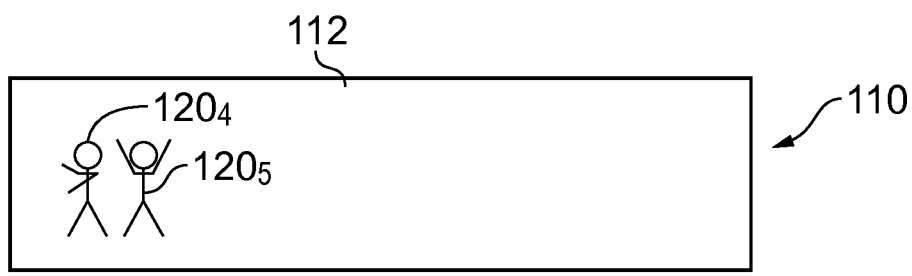

FIGS. 12A and 12B illustrate an 'object-specific' parameterization of the video 300 according to when and where any activity occurs in the video and additionally, at least, who or what the activity is performed in relation to.

FIG. 11A illustrates a displayed panoramic scene 112 of the video 300. This displayed scene includes possible objects including locations (not illustrated).

When one of the objects is selected by, for example, touching the display portion corresponding to the object, then the method 100 is performed and provides a visual access menu 110 as illustrated in FIG. 12A or 12B that enables a user to access video segments 310 of the scene 202 for the selected object. Different user-selectable menu options $120_n$ are displayed at different locations in the scene 112. Selection of a particular user-selectable menu option causes access to one or more first video segments 310 of activity at that location $122_1$ in the scene 202.

The parameterization of the video 300 is performed automatically in respect of which subjects have interacted with the selected object. This creates clusters of events and corresponding video segments 310. One cluster of video segments 310 relates to the selected object and the first subject. These video segments 310 are represented by corresponding user-selectable menu options $120_n$ (FIG. 12A). Another cluster of video segments 310 relates to the selected object and the second subject. These video segments 310 are represented by corresponding user-selectable menu options $120_n$ (FIG. 12B).

FIG. 12A illustrates a visual access menu 110 that comprises multiple user-selectable menu options $120_n$ that are displayed at different locations in the scene 112 for video segments 310 relating to interaction of a first subject with a user-selected object at different times. The different locations represent different times. Selection of a particular user-selectable menu option $120_n$ causes access to one or more video segments 310 of activity relating to the selected object and the first subject in the scene 202, at different times.

FIG. 12B illustrates a visual access menu 110 that comprises multiple user-selectable menu options $120_n$ that are displayed at different locations in the scene 112 for video segments 310 relating to interaction of a second subject with a user-selected object at different times. The different locations represent different times. Selection of a particular user-selectable menu option $120_n$ causes access to one or more video segments 310 of activity relating to the selected object and the second subject in the scene 202, at different times.

An automatic selection criteria may be used to decide whether to present the visual access menu 110 associated with the first subject (FIG. 12A) or the second subject (FIG. 12B). In this example, the criteria used is the number of clusters (video segments 310). As the visual access menu 110 associated with the first subject (FIG. 12A) has more user-selectable menu options $120_n$ it is displayed first. The user may provide a user input to cause display of the visual access menu 110 associated with the second subject (FIG. 12B)

Therefore selection at FIG. 11A selects the object and user selection at FIGS. 12A/12B selects the subject and time.

There may be display, at a first location $122_n$ in the scene 202, of a first user-selectable menu option $120_n$ that when selected causes access to one or more first video segments 310 of activity in relation to a selected object at the first location $122_n$ in the scene 202 and, at a second location $122_m$ in the scene 202, of a second user-selectable menu option $120_m$ that when selected causes access to one or more second video segments 310 of activity in relation to the selected object. These may be displayed simultaneously as illustrated in FIG. 12A or FIG. 12B and/or may be sequentially as illustrated in the switch from FIG. 12A to FIG. 12B.

Figure 13A:
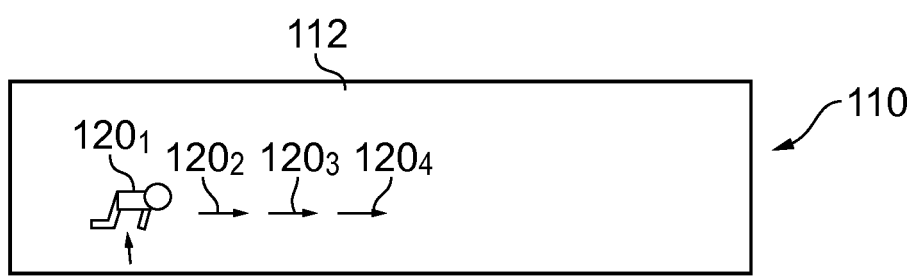
FIGS. 13A and 13B illustrate an example of a visual access menu comprising multiple user-selectable menu options for different waypoints along a route taken by the first subject, before and after selection of one of the waypoint user-selectable menu options.
Figure 13B:
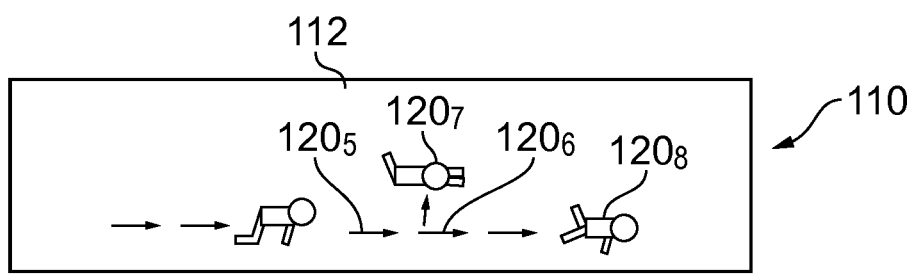

FIGS. 11A and 13A, 13B illustrate an 'activity-specific' parameterization of the video 300 according to when and where any activity occurs in the video and additionally, at least, what the activity is that is performed.

FIG. 11A illustrates a displayed panoramic scene 112 of the video 300.

When an activity is selected by a user or automatically, then the method 100 is performed and provides a visual access menu 110 as illustrated in FIG. 13A or 13B that enables a user to access video segments 310 of the scene 202. Different user-selectable menu options $120_n$ are displayed at different locations in the scene 112. The different locations represent different locations (and times). Selection of a particular user-selectable menu option $120_n$ causes access to one or more first video segments 310 of activity at that location $122_n$ in the scene 202.

The parameterization of the video 300 is performed automatically in respect of the selected activity. This creates a cluster of events and corresponding video segments 310 that include the selected activity and these video segments 310 are represented by corresponding user-selectable menu options $120_n$.

The activity may or may not be subject specific.

FIG. 12A illustrates a visual access menu 110 that comprises multiple user-selectable menu options $120_n$ that are displayed at different locations in the scene 112 for video segments 310 relating to movement of a first subject at different locations/times. Selection of a particular user-selectable menu option $120_n$ causes access to one or more video segments 310 of activity relating to the movement of the first subject in the scene 202, at different locations/times.

FIG. 12B illustrates a visual access menu 110 created after the user-selectable menu options $120_3$ has been selected. The visual access menu 110 comprises multiple user-selectable menu options $120_m$ that are displayed at different locations in the scene 112 for video segments 310 relating to movement of the first subject at different locations/times. Selection of a particular user-selectable menu option $120_m$ causes access to one or more video segments 310 of activity relating to the elected object and the first subject in the scene 202, at different locations/times.

Therefore selection at FIG. 11A selects the activity, and user-selection at FIG. 13A selects the location/time.

There may be display, at a first location $122_n$ in the scene 202, of a first user-selectable menu option $120_n$ that when selected causes access to one or more first video segments 310 of activity in relation to a selected activity at the first location $122_n$ in the scene 202 and, at a second location $122_m$ in the scene 202, of a second user-selectable menu option $120_m$ that when selected causes access to one or more second video segments 310 of activity in relation to the selected activity. These may be displayed simultaneously as illustrated in FIG. 13A and/or may be displayed sequentially as illustrated in the switch from FIG. 13A to FIG. 13B.

In the example of FIG. 13A, the visual access menu 110 comprises multiple user-selectable menu options $120_n$ for different waypoints along a route taken by the first subject.

In the example of FIG. 13B, after one of the waypoint user-selectable menu options $120_n$ has been selected by a user, the visual access menu 110 comprises multiple user-selectable menu options 120$_n$ for different waypoints along different routes taken by the first subject.

The selection of a user-selectable menu option 120$_n$ in FIG. 13A may cause the video 300 to be re-parameterised as described in relation to, for example, FIG. 7B to convert the visual access menu 110 in FIG. 13A that represents multiple video segments 130 for movement of the first subject during a time period T1 into the visual access menu 110 in FIG. 13B that represents multiple video segments 130 for movement of the first subject during subsequent different time period T2. Thus selecting different user-selectable menu option 120$_n$ illustrated as→may change the time period used to generate user-selectable menu option 120$_n$ and selecting user-selectable menu option 120$_n$ illustrating the first subject may cause playback of a video segment 310.

Referring to FIG. 5 the method 500 may in some but not necessarily all examples comprise the following blocks:
(i) obtain one or more videos
(ii) obtain key objects from the videos
(iii) obtain key locations and/or activities from the videos
(iv) obtain key routes from the videos
(v) create a summary video by superimposing the key object performing the key activities at the key locations on the background
(vi) enable user to interact with a representation of the key object along a route
(vii) obtain a new set of summary videos from the set of videos where the object has moved along the route
(viii) create a summary video display by superimposing the object on continued route visualizations.

The block (ii) corresponds to subject-specific parameterization of the video (including when and where any activity occurs in the video)—see FIGS. 8A-8C, 10-13.

The block (iii) corresponds to object-specific parameterization of the video (FIGS. 12A-12B) and/or activity-specific parameterization of the video (FIG. 13A-13B).

The block (iv) corresponds to parameterization of the video where the activity relates to a route (FIG. 13A-13B).

The block (v) corresponds to displaying the visual access menu 110 using the superimposed key object as user-selectable menu options 120$_n$.

The block (vi) corresponds to user selection of a user-selectable menu option 120$_n$ from the displayed the visual access menu 110.

The block (vii) corresponds to generation of a new visual access menu 110 which may be based on re-parameterization of the video 300 using constraints defined by the user selection to define new clusters of video segments 310 and corresponding new user-selectable menu options 120$_n$. In this case, the constraint is a position along a route.

The block (viii) corresponds to displaying the new visual access menu 110 using the superimposed key object as new user-selectable menu options 120$_n$. In this case the new user-selectable menu options 120$_n$ relate to the key object moving along the route.

It will be appreciated from the foregoing that the parameterization and clustering defines a visual access menu with user-selectable menu options 120$_n$. The menu structure is such that the user can via one or more menu levels access and play a particular video segment 310. The menu structure is dependent upon the parameterization and segmentation which may be recalculated whenever the user accesses a user-selectable menu options 120$_n$ that further specifies the parameterization as opposed to playing a video segment 310. The user is therefore able to zoom-in on and select for playing a video segment by constraining sequentially parameters such as the subject, the object, the activity, the location, the time (see FIGS. 11, 12, 13).

The methods 100, 500 described above in relation to FIGS. 1-8 may be performed by a controller 801. Implementation of the controller 801 may be as controller circuitry. The controller 801 may be implemented in hardware alone, have certain aspects in software including firmware alone or can be a combination of hardware and software (including firmware).

Figure 9:
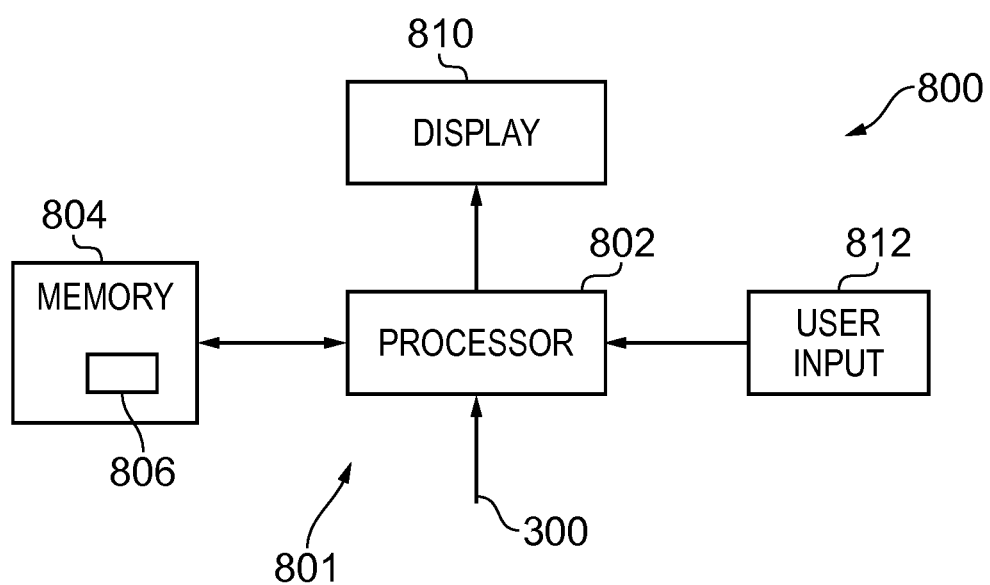
FIG. 9 illustrates an example of an apparatus.

As illustrated in FIG. 9 the controller 801 may be implemented using instructions that enable hardware functionality, for example, by using executable computer program instructions 806 in a general-purpose or special-purpose processor 802 that may be stored on a computer readable storage medium (disk, memory etc) to be executed by such a processor 802.

The processor 802 is configured to read from and write to the memory 804. The processor 802 may also comprise an output interface via which data and/or commands are output by the processor 802 and an input interface via which data and/or commands are input to the processor 802.

The memory 804 stores at least a computer program 806 comprising computer program instructions (computer program code) that controls the operation of the apparatus 800 when loaded into the processor 802. The computer program instructions, of the computer program 806, provide the logic and routines that enables the apparatus to perform the methods 100, 500 illustrated in FIGS. 1-8. The processor 802 by reading the memory 804 is able to load and execute the computer program 806.

The controller 801 is configured to receive the video 300 for processing.

The controller 801 is configured to receive user input via a user input device or devices 812.

The controller is configured to provide user output via the display 810.

The display 810 may be a visual display. Examples of visual displays include liquid crystal displays, organic light emitting displays, emissive, reflective and transflective displays, direct retina projection display, near eye displays etc.

The user input device 812 comprises circuitry that detects user actions. The detected user actions may, for example, be gestures performed in a real space. Gestures may be detected in a number of ways. For example, depth sensors may be used to detect movement of parts a user and/or or image sensors may be used to detect movement of parts of a user and/or positional/movement sensors attached to a limb of a user may be used to detect movement of the limb.

The apparatus 800 may used to provide "mediated reality" to a user. This refers to a user visually experiencing a fully or partially artificial environment (a virtual space) as a virtual scene at least partially displayed by a computer to a user. The virtual scene is determined by a point of view within the virtual space and a field of view. Displaying the virtual scene means providing it in a form that can be seen by the user. The apparatus 800 may be an "augmented reality" apparatus. Augmented reality is a form of mediated reality in which a user visually experiences a partially artificial environment (a virtual space) as a virtual scene comprising a real scene of a physical real world environment (real space) supplemented by one or more visual elements displayed by an apparatus to a user. The apparatus 800 may be a "virtual reality" apparatus. Virtual reality is a form of mediated reality in which a user visually experiences a fully artificial environment (a virtual space) as a virtual scene displayed by an apparatus to a user;

The display 810 may be a visual display that provides light that displays at least parts of a virtual scene to a user.

The apparatus 800 may, for example, be a handheld apparatus comprising a display screen as display 810. The handheld apparatus may be or may be operated as a see-video arrangement for augmented reality that enables a live or recorded video of a real scene to be displayed on the display 810 for viewing by the user while one or more visual elements are simultaneously displayed on the display for viewing by the user. The combination of the displayed real scene and displayed one or more visual elements provides a virtual scene to the user.

The apparatus 800 may be a head-mounted apparatus. The head-mounted apparatus 800 may be a see-through arrangement for augmented reality that enables a live real scene to be viewed while one or more visual elements are displayed by the display to the user to provide in combination a virtual scene. In this case a visor, if present, is transparent or semi-transparent so that the live real scene 202 can be viewed through the visor.

The head-mounted apparatus may be operated as a see-video arrangement for augmented reality that enables a live or recorded video of a real scene to be displayed by the display 810 for viewing by the user while one or more visual elements are simultaneously displayed by the display 810 for viewing by the user. The combination of the displayed real scene and displayed one or more visual elements provides a virtual scene to the user. In this case a visor is opaque and may be used as the display 810.

The apparatus 800 may therefore comprise: at least one processor 802; and at least one memory 804 including computer program code 806 the at least one memory 804 and the computer program code 806 configured to, with the at least one processor 802, cause the apparatus 800 at least to perform: causing provision of a visual access menu to enable a user to access video segments of a scene comprising: causing display of an image of the scene; causing display, at a first location in the scene, of a first user-selectable menu option that when selected causes access to one or more first video segments of activity at the first location in the scene; and causing display, at a second location in the scene, of a second user-selectable menu option that when selected causes access to one or more second video segments of activity at the second location in the scene.

Figure 10:
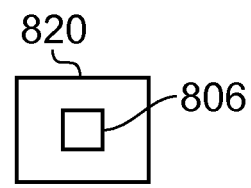
FIG. 10 illustrates an example of a record carrier.

As illustrated in FIG. 10, the computer program 806 may arrive at the apparatus 800 via any suitable delivery mechanism 820. The delivery mechanism 820 may be, for example, a non-transitory computer-readable storage medium, a computer program product, a memory device, a record medium such as a compact disc read-only memory (CD-ROM) or digital versatile disc (DVD), an article of manufacture that tangibly embodies the computer program 806. The delivery mechanism may be a signal configured to reliably transfer the computer program 806. The apparatus 800 may propagate or transmit the computer program 806 as a computer data signal.

Although the memory 804 is illustrated as a single component/circuitry it may be implemented as one or more separate components/circuitry some or all of which may be integrated/removable and/or may provide permanent/semi-permanent/dynamic/cached storage.

Although the processor 802 is illustrated as a single component/circuitry it may be implemented as one or more separate components/circuitry some or all of which may be integrated/removable. The processor 802 may be a single core or multi-core processor.

References to 'computer-readable storage medium', 'computer program product', 'tangibly embodied computer program' etc. or a 'controller', 'computer', 'processor' etc. should be understood to encompass not only computers having different architectures such as single/multi-processor architectures and sequential (Von Neumann)/parallel architectures but also specialized circuits such as field-programmable gate arrays (FPGA), application specific circuits (ASIC), signal processing devices and other processing circuitry. References to computer program, instructions, code etc. should be understood to encompass software for a programmable processor or firmware such as, for example, the programmable content of a hardware device whether instructions for a processor, or configuration settings for a fixed-function device, gate array or programmable logic device etc.

As used in this application, the term 'circuitry' refers to all of the following:
(a) hardware-only circuit implementations (such as implementations in only analog and/or digital circuitry) and
(b) to combinations of circuits and software (and/or firmware), such as (as applicable): (i) to a combination of processor(s) or (ii) to portions of processor(s)/software (including digital signal processor(s)), software, and memory(ies) that work together to cause an apparatus, such as a mobile phone or server, to perform various functions) and
(c) to circuits, such as a microprocessor(s) or a portion of a microprocessor(s), that require software or firmware for operation, even if the software or firmware is not physically present. This definition of 'circuitry' applies to all uses of this term in this application, including in any claims. As a further example, as used in this application, the term "circuitry" would also cover an implementation of merely a processor (or multiple processors) or portion of a processor and its (or their) accompanying software and/or firmware. The term "circuitry" would also cover, for example and if applicable to the particular claim element, a baseband integrated circuit or applications processor integrated circuit for a mobile phone or a similar integrated circuit in a server, a cellular network device, or other network device.

The blocks illustrated in the FIG. 5 may represent steps in a method and/or sections of code in the computer program 806. The illustration of a particular order to the blocks does not necessarily imply that there is a required or preferred order for the blocks and the order and arrangement of the block may be varied. Furthermore, it may be possible for some blocks to be omitted.

Where a structural feature has been described, it may be replaced by means for performing one or more of the functions of the structural feature whether that function or those functions are explicitly or implicitly described.

The controller 801 comprises: means for causing display of at least a portion of an image of a scene; means for causing display, at a first location in the scene, of a first user-selectable menu option that when selected causes access to one or more first video segments of activity at the first location in the scene; and means for causing display, at a second location in the scene, of a second user-selectable menu option that when selected causes access to one or more second video segments of activity at the second location in the scene.

The apparatus 800 comprises: means for displaying at least a part of an image of the scene; means for displaying, at a first location in the scene, first user-selectable menu option; means for displaying, at a second location in the scene, a second user-selectable menu option; means responsive to user selection of the first user-selectable menu option to provide access to one or more first video segments of activity at the first location in the scene; and means responsive to user selection of the second user-selectable menu option to provide access to one or more second video segments of activity at the second location in the scene.

The term 'comprise' is used in this document with an inclusive not an exclusive meaning. That is any reference to X comprising Y indicates that X may comprise only one Y or may comprise more than one Y. If it is intended to use 'comprise' with an exclusive meaning then it will be made clear in the context by referring to "comprising only one." or by using "consisting".

In this brief description, reference has been made to various examples. The description of features or functions in relation to an example indicates that those features or functions are present in that example. The use of the term 'example' or 'for example' or 'may' in the text denotes, whether explicitly stated or not, that such features or functions are present in at least the described example, whether described as an example or not, and that they can be, but are not necessarily, present in some of or all other examples. Thus 'example', 'for example' or 'may' refers to a particular instance in a class of examples. A property of the instance can be a property of only that instance or a property of the class or a property of a sub-class of the class that includes some but not all of the instances in the class. It is therefore implicitly disclosed that a features described with reference to one example but not with reference to another example, can where possible be used in that other example but does not necessarily have to be used in that other example.

Although embodiments of the present invention have been described in the preceding paragraphs with reference to various examples, it should be appreciated that modifications to the examples given can be made without departing from the scope of the invention as claimed.

Features described in the preceding description may be used in combinations other than the combinations explicitly described.

Although functions have been described with reference to certain features, those functions may be performable by other features whether described or not.

Although features have been described with reference to certain embodiments, those features may also be present in other embodiments whether described or not.

Whilst endeavoring in the foregoing specification to draw attention to those features of the invention believed to be of particular importance it should be understood that the Applicant claims protection in respect of any patentable feature or combination of features hereinbefore referred to and/or shown in the drawings whether or not particular emphasis has been placed thereon.

We claim:

1. An apparatus comprising:
   at least one processor; and
   at least one non-transitory memory including computer program code,
   the at least one non-transitory memory and the computer program code configured to, with the at least one processor, cause the apparatus to perform at least the following:
   cause provision of a visual access menu configured to access spatio-temporal video segments of a scene, wherein the causing of the provision of the visual access menu comprises:
   causing display of at least a portion of an image of the scene;
   causing display, at a first location in the scene, of a first user-selectable menu option that when selected causes access to one or more first spatio-temporal video segments of activity at the first location in the scene; and
   causing display, at a second location in the scene, of a second user-selectable menu option that when selected causes access to one or more second spatio-temporal video segments of activity at the second location in the scene;
   wherein the first user-selectable menu option for accessing one or more first spatio-temporal video segments of activity at the first location in the scene, is a playing first video excerpt linking to the one or more first spatio-temporal video segments and the second user-selectable menu option for accessing one or more second spatio-temporal video segments of activity at the second location in the scene, is a playing second video excerpt linking to the one or more second video segments;
   wherein the first video excerpt is a video portion from a first spatio-temporal video segment, playing in a loop at the first location in the scene, and wherein user-selection of the first video excerpt causes playing of the first spatio-temporal video segment and/or wherein the second video excerpt is a video portion from a second spatio-temporal video segment, playing in a loop at the second location in the scene, and wherein user-selection of the second video excerpt causes access to the second spatio-temporal video segment.

2. An apparatus as claimed in claim 1, wherein the apparatus is further caused to:
   cause parameterization of video according to multiple parameters; and
   cause determination of spatio-temporal video segments based on the parameterization of video.

3. An apparatus as claimed in claim 2, wherein the determination of spatio-temporal video segments is based on performing clustering analysis in a parameter space defined by at least some of the multiple parameters.

4. An apparatus as claimed in claim 2, wherein the apparatus is further caused to:
   cause parameterization of video according to at least when and where activity occurs in the video; and
   cause determination of spatio-temporal video segments based on at least when and where activity occurs in the video.

5. An apparatus as claimed in claim 2, wherein the apparatus is further caused to:
   cause parameterization of video according to at least when and where activity occurs in the video and who is performing the activity; and cause determination of spatio-temporal video segments based on at least when and where activity occurs in the video and who is performing the activity, and/or
   cause parameterization of video according to at least when and where activity occurs in the video and what the activity is; and cause determination of video segments based on at least when and where activity occurs in the video and what the activity is and/or
   cause parameterization of video according to at least when and where activity occurs in the video and what the activity is in relation to; and cause determination of video segments based on at least when and where activity occurs in the video and what the activity is in relation to.

6. An apparatus as claimed in claim 2, wherein the multiple parameters are user-determined parameters and/or video content determined parameters.

7. An apparatus as claimed in claim 1, wherein the first spatio-temporal video segment is referenced by at least a first vector in a parameter space defined by at least some of the multiple parameters and the second spatio-temporal video segment is referenced by at least a second different vector in the same parameter space.

8. An apparatus as claimed in claim 1, wherein a first video excerpt and a second video excerpt are simultaneously displayed, while playing, in a semi-transparent form overlaying the image of the scene.

9. An apparatus as claimed in claim 1, wherein the first video excerpt is a short video portion from the first spatio-temporal video segment, and/or wherein the second video excerpt is a concatenation of short video portions from the second spatio-temporal video segment.

10. An apparatus as claimed in claim 1, wherein the first user-selectable menu option when selected causes access to a menu of first spatio-temporal video segments of activity at the first location in the scene at different times.

11. An apparatus as claimed in claim 1, wherein the first and second spatio-temporal video segments are different spatio-temporal segments from video with a panoramic field of view.

12. The apparatus of claim 1, wherein the first user-selectable menu option and the second user-selectable menu option are simultaneously displayed.

13. The apparatus of claim 1, wherein the first user-selectable menu option is displayed at a first location in the displayed portion of the image of the scene, and the second user-selectable menu option is displayed at a second location in the displayed portion of the image of the scene.

14. A method comprising:
causing provision of a visual access menu to enable a user to access spatio-temporal video segments of a scene, wherein the causing of the provision of the visual access menu comprises:
causing display of at least a portion of an image of the scene;
causing display, at a first location in the scene, of a first user-selectable menu option that when selected causes access to one or more first spatio-temporal video segments of activity at the first location in the scene; and
causing display, at a second location in the scene, of a second user-selectable menu option that when selected causes access to one or more second spatio-temporal video segments of activity at the second location in the scene;
wherein the first user-selectable menu option for accessing one or more first spatio-temporal video segments of activity at the first location in the scene, is a playing first video excerpt linking to the one or more first spatio-temporal video segments and the second user-selectable menu option for accessing one or more second spatio-temporal video segments of activity at the second location in the scene, is a playing second video excerpt linking to the one or more second video segments;
wherein the first video excerpt is a video portion from a first spatio-temporal video segment, playing in a loop at the first location in the scene, and wherein user-selection of the first video excerpt causes playing of the first spatio-temporal video segment and/or wherein the second video excerpt is a video portion from a second spatio-temporal video segment, playing in a loop at the second location in the scene, and wherein user-selection of the second video excerpt causes access to the second spatio-temporal video segment.

15. A method as claimed in claim 14, comprising:
causing parameterization of video according to multiple parameters; and
causing determination of spatio-temporal video segments based on the parameterization of video.

16. A method as claimed in claim 15, wherein the determination of spatio-temporal video segments is based on performing clustering analysis in a parameter space defined by at least some of the multiple parameters.

17. A method as claimed in claim 15, comprising: causing parameterization of video according to at least when and where activity occurs in the video; and causing determination of spatio-temporal video segments based on at least when and where activity occurs in the video.

18. A method as claimed in claim 15, causing parameterization of video according to at least when and where activity occurs in the video and who is performing the activity; and causing determination of spatio-temporal video segments based on at least when and where activity occurs in the video and who is performing the activity, and/or
causing parameterization of video according to at least when and where activity occurs in the video and what the activity is; and causing determination of video segments based on at least when and where activity occurs in the video and what the activity is and/or
causing parameterization of video according to at least when and where activity occurs in the video and what the activity is in relation to; and causing determination of video segments based on at least when and where activity occurs in the video and what the activity is in relation to.

19. A method as claimed in claim 15, wherein the multiple parameters are user-determined parameters and/or video content determined parameters.

20. A method as claimed in claim 14, wherein the first spatio-temporal video segment is referenced by at least a first vector in a parameter space defined by at least some of the multiple parameters and the second spatio-temporal video segment is referenced by at least a second different vector in the same parameter space.

21. At least one non-transitory computer readable medium comprising instructions that, when executed, perform:
cause provision of a visual access menu configured to access spatio-temporal video segments of a scene, wherein the causing of the provision of the visual access menu comprises:
causing display of at least a portion of an image of the scene;
causing display, at a first location in the scene, of a first user-selectable menu option that when selected causes access to one or more first spatio-temporal video segments of activity at the first location in the scene; and
causing display, at a second location in the scene, of a second user-selectable menu option that when selected causes access to one or more second spatio-temporal video segments of activity at the second location in the scene;
wherein the first user-selectable menu option for accessing one or more first spatio-temporal video segments of activity at the first location in the scene, is a playing first video excerpt linking to the one or more first spatio-temporal video segments and the second user-selectable menu option for accessing one or more second spatio-temporal video segments of activity at the second location in the scene, is a playing second video excerpt linking to the one or more second video segments;

wherein the first video excerpt is a video portion from a first spatio-temporal video segment, playing in a loop at the first location in the scene, and wherein user-selection of the first video excerpt causes playing of the first spatio-temporal video segment and/or wherein the second video excerpt is a video portion from a second spatio-temporal video segment, playing in a loop at the second location in the scene, and wherein user-selection of the second video excerpt causes access to the second spatio-temporal video segment.

* * * * *